United States Patent
Pound et al.

(10) Patent No.: US 10,360,145 B2
(45) Date of Patent: Jul. 23, 2019

(54) HANDLING LARGE WRITES TO DISTRIBUTED LOGS

(71) Applicant: SAP SE, Walldorf (DE)

(72) Inventors: Jeffrey Pound, Kitchener (CA); Nathan Auch, Waterloo (CA); Peter Bumbulis, Cambridge (CA); Anil Kumar Goel, Waterloo (CA); Scott MacLean, Waterloo (CA); Eric Garber, Waterloo (CA)

(73) Assignee: SAP SE, Walldorf (DE)

( * ) Notice: Subject to any disclaimer, the term of this patent is extended or adjusted under 35 U.S.C. 154(b) by 570 days.

(21) Appl. No.: 15/180,816

(22) Filed: Jun. 13, 2016

(65) Prior Publication Data
US 2017/0357574 A1    Dec. 14, 2017

(51) Int. Cl.
*G06F 16/00* (2019.01)
*G06F 12/02* (2006.01)
*G06F 11/14* (2006.01)
*G06F 16/23* (2019.01)

(52) U.S. Cl.
CPC .......... *G06F 12/0253* (2013.01); *G06F 11/14* (2013.01); *G06F 12/0246* (2013.01); *G06F 16/2358* (2019.01); *G06F 16/2365* (2019.01)

(58) Field of Classification Search
CPC .. G06F 16/2329; G06F 11/14; G06F 11/1471; G06F 12/0253; G06F 16/2358; G06F 16/2365; G06F 11/2094; G06F 12/0246
See application file for complete search history.

(56) References Cited

U.S. PATENT DOCUMENTS

| 7,263,592 | B2 * | 8/2007 | Michael | G06F 9/5016 711/147 |
| 7,340,494 | B1 * | 3/2008 | Detlefs | G06F 12/0269 |
| 8,583,783 | B1 * | 11/2013 | Hayward | G06F 12/0253 707/813 |
| 8,683,262 | B1 * | 3/2014 | Subbiah | G06F 16/90 714/16 |
| 9,875,173 | B2 * | 1/2018 | Marron | G06F 11/362 |
| 2004/0221030 | A1 * | 11/2004 | Huras | G06F 16/2358 709/224 |
| 2007/0220059 | A1 * | 9/2007 | Lu | G06F 16/2358 |
| 2010/0325371 | A1 * | 12/2010 | Jagadish | G06F 11/3476 711/150 |

(Continued)

OTHER PUBLICATIONS

Goel, Anil K. et al. "Towards Scalable Realtime Analytics: An Architecture for Scaleout of OLxP Workloads", Proceedings of the VLDB Endowment, vol. 8, No. 12, 2015, (pp. 1716-1727, 12 total pages).

*Primary Examiner* — Merilyn P Nguyen
(74) *Attorney, Agent, or Firm* — Buckley, Maschoff & Talwalkar LLC

(57) ABSTRACT

A system includes writing of log data in chunks over a first range of heap log sequence positions of a heap log stored in the non-volatile memory system, and writing of a heap anchor marker in a first anchor stream of a transaction log stored in the non-volatile memory system, at a first transaction log sequence position of the transaction log, wherein the first anchor stream is associated with a first stream of the transaction log, and the heap anchor marker identifies the first range of heap log sequence positions of the heap log.

18 Claims, 7 Drawing Sheets

(56) References Cited

U.S. PATENT DOCUMENTS

2012/0109895 A1\* 5/2012 Zwilling ............. G06F 11/1471
707/648
2017/0351543 A1\* 12/2017 Kimura ................... G06F 9/467

\* cited by examiner

| S1 | "a" |     |   | "g" |
|----|-----|-----|---|-----|
| S2 |     | "c" |   |     |
| S3 | "b" | "d" |   |     |
|    | 0   | 1   | 2 | 3   |

*FIG. 1*

| GC Stream | Create(S1, TxA) | | |
|---|---|---|---|
| S1 | | | |
| S1-AnchorStream | | | |
| S2 | | | |
| S2-AnchorStream | | | |
| S3 | | | |
| S3-AnchorStream | | | |
| 0 | 1 | 2 | |

| S1-TxA | "a" | | "b" | | "c" | |
|---|---|---|---|---|---|---|
| 0 | 1 | 2 | 3 | 4 | 5 | |

FIG. 5

| GC Stream | Create(S1, TxA) | ... | Anchor(S1,TxA, 0, 5) |
|---|---|---|---|
| S1 | | ... | |
| S1-AnchorStream | | | Anchor(S1,TxA, 0, 5) |
| S2 | | ... | |
| S2-AnchorStream | | | |
| S3 | | ... | |
| S3-AnchorStream | | | |
| 0 | 1 | 2 | |

| S1-TxA | "a" | | "b" | | "c" | |
|---|---|---|---|---|---|---|
| 0 | 1 | 2 | 3 | 4 | 5 | |

FIG. 6

| GC Stream | [ Create(S1, TxA), Create(S2, TxA) ] | | |
|---|---|---|---|
| S1 | | | |
| S1-AnchorStream | | | |
| S2 | | | |
| S2-AnchorStream | | | |
| S3 | | | |
| S3-AnchorStream | | | |
| | 0 | 1 | 2 |

| | | | | | | |
|---|---|---|---|---|---|---|
| S1-TxA | "a" | | "b" | | "c" | |
| S2-TxA | | "d" | | | | |
| | 0 | 1 | 2 | 3 | 4 | 5 |

*FIG. 7*

| GC Stream | [ Create(S1, TxA), Create(S2, TxA) ] | ... | [ Anchor(S1,TxA, 0, 5), Anchor(S2, TxA, 1, 2) ] |
|---|---|---|---|
| S1 | | ... | |
| S1-AnchorStream | | | Anchor(S1,TxA, 0, 5) |
| S2 | | ... | |
| S2-AnchorStream | | | Anchor(S2, TxA, 1, 2) |
| S3 | | ... | |
| S3-AnchorStream | | | |
| | 0 | 1 | 2 |

| | | | | | | |
|---|---|---|---|---|---|---|
| S1-TxA | "a" | | "b" | | "c" | |
| S2-TxA | | "d" | | | | |
| | 0 | 1 | 2 | 3 | 4 | 5 |

*FIG. 8*

HANDLING LARGE WRITES TO DISTRIBUTED LOGS

BACKGROUND

Enterprise database systems store data related to many aspects of a business enterprise. Every transaction (where "transaction" refers to a set of operations) against the data stored in database causes a log record to be written into a transaction log. The log record typically describes the transaction and its effect on the data. The log records of the transaction log may therefore be used to recover from errors or to restore the database to a prior state.

Conventionally, a transaction log (both single host and distributed shared logs) is written by appending to end of the log. A large write to the log blocks readers which are attempting to scan log positions which have been written but which are beyond the log position of the ongoing large write.

FIG. 1 is a tabular representation of a transaction log including three streams. The transaction log supports atomic writes to log sequence numbers (LSNs), depicted as LSNs 0, 1, 2 and 3. As shown, the write to LSN 2 has not yet completed, even though the write to LSN 3 has completed. A reader is prevented from scanning past this "hole" at LSN 2, so as to ensure log consistency. Techniques for alleviating this problem, which is more likely to arise in the case of large writes, are therefore desired.

BRIEF DESCRIPTION OF THE DRAWINGS

FIG. 1 is a tabular representation of a transaction log.

FIG. 5 comprises tabular representations of a transaction log and a heap store according to some embodiments.

FIG. 6 comprises tabular representations of a transaction log and a heap store according to some embodiments.

FIG. 7 comprises tabular representations of a transaction log and a heap store according to some embodiments.

FIG. 8 comprises tabular representations of a transaction log and a heap store according to some embodiments.

DETAILED DESCRIPTION

The following description is provided to enable any person in the art to make and use the described embodiments. Various modifications, however, will remain readily apparent to those in the art.

Some embodiments support the storage of large writes in a distributed log. Embodiments may provide atomic writes to a single logical log position, non-blocking writes which allow readers and regular log writers to make progress while a heap write is progressing. Embodiments may also provide durability and consistency guarantees equivalent to those of the underlying distributed log, a mechanism for trimming heaps from the log to reclaim space, and/or a mechanism to reclaim partial heap writes from aborted or failed writers.

Figure 2:
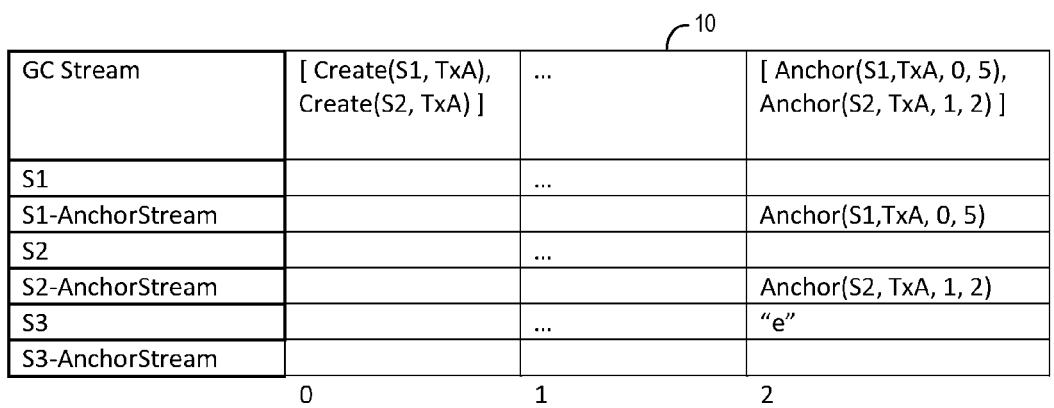
FIG. 2 comprises tabular representations of a transaction log and a heap store according to some embodiments.
Figure 2:
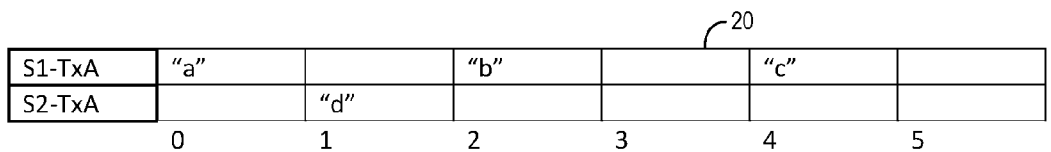

As an introduction to some embodiments, FIG. 2 illustrates tabular representations of transaction log 10 and heap log 20. For each transaction log 10 in a given log storage system, some embodiments provide a second independently-sequenced heap log 20. Streams for heaps in heap log 20 are named S-TxId, where S is the stream in transaction log 10 where the heap will be anchored, and TxId is the ID of the transaction that is writing the heap. As shown, each heap referenced in transaction log 10 is stored in a respectively-named stream in heap log 20.

Heap markers are written into each transaction log 10 to record when heaps are created, anchored, or aborted. Each stream in transaction log 10 (i.e., Si) is associated with a corresponding anchor stream (i.e., Si-AnchorStream). Transaction log 10 includes a garbage collection stream (i.e., GC stream) which may be used as described below to facilitate garbage collection. The GC stream and the anchors streams are hidden from normal clients (e.g., log writers) according to some embodiments.

Anchor heap markers are written into the GC stream and into the anchor stream for the stream which is referencing the associated heap data. Create and abort heap markers are written into the GC stream and not into any anchor streams. According to some embodiments, one or more of each type of heap marker may be written to the GC stream for a given LSN, but different kinds of heap markers may not be written to a same LSN.

Based on transaction log 10 and heap log 20, and using a technique that will be described in detail below, a client requesting a scan of streams S1, S2, S3 of transaction log 10 at LSN 2 will receive in return ["a", "b", "c"] for S1, ["d"] for S2, and ["e"] for S3.

Figure 3:
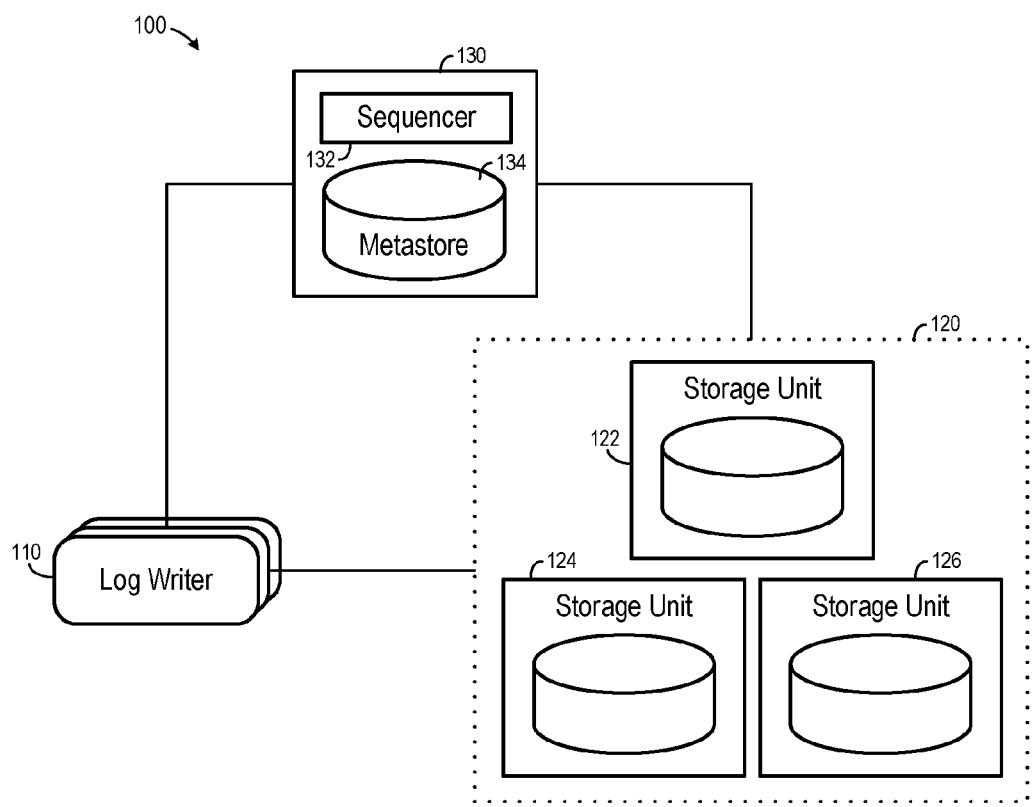
FIG. 3 is a block diagram of a system architecture according to some embodiments.

FIG. 3 is a block diagram of architecture 100 according to some embodiments. Embodiments are not limited to architecture 100 or to a database architecture.

Architecture 100 includes log writers 110, storage cluster 120 and management host 130. The elements of architecture 100 may operate to provide storage and replication of log data according to some embodiments.

Storage cluster 120 comprises three storage units 122, 124 and 126, but embodiments are not limited thereto. Each storage unit of storage cluster 120 is intended to store a replica of a particular data set, thereby providing fault-tolerance. Storage cluster 120 comprises one primary storage unit and one or more secondary storage units. According to some embodiments, the primary storage unit receives write requests and manages replication of the writes within the secondary storage units. Some embodiments may employ only one storage unit, in which case replication is not supported.

Each of storage units 122, 124 and 126 may comprise any query-responsive data source or sources that are or become known, including but not limited to a structured-query language (SQL) relational database management system. Each of storage units 122, 124 and 126 may comprise a relational database, a multi-dimensional database, an eXtendable Markup Language (XML) document, or any other data storage system storing structured and/or unstructured data. Embodiments are not limited to any number or types of data sources.

In some embodiments, the log data may be stored as one or more of conventional tabular data, row-based data, column-based data, and object-based data. Moreover, the data may be indexed and/or selectively replicated in an index to allow fast searching and retrieval thereof. Storage cluster 120 may support multi-tenancy to separately support multiple unrelated clients by providing multiple logical database systems which are programmatically isolated from one another.

On or more of storage units 122, 124 and 126 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of log writers 110 may comprise one or more computing devices executing software applications to request the writing of log data to storage cluster 120. The software may comprise one or more database applications. A log writer 110 may comprise a distributed node of a database management system according to some embodiments. Such a node may comprise one or more processors, memory and software which is executable to perform database management functions.

Management host 130 includes sequencer 132 and metastore 134. Sequencer 132 and metastore 134 need not be located on the same host in some embodiments. Metastore 134 may comprise a separate distributed system, and sequencer 132 may execute on any host, including on one or more of storage units 122, 124 and 126.

Sequencer 132 issues a monotonically-increasing log sequence number (LSN) to a log writer 110 upon request. Log writers 110 use such sequence numbers as keys in requests for writes to storage cluster 120. Sequencer 132 may provide a first sequence of LSNs for writes to a transaction log and a second independently-sequenced set of LSNs for writes to a heap log as described herein.

Because sequencer 132 is not a distributed component in the system (e.g., more storage units may be added, but only one sequencer is used for a given primary transaction log), sequencer 132 has the potential to present a performance bottleneck. This bottleneck may be alleviated by using an independent sequencer to provide independent LSNs for writes to the heap log. Further performance advantages may be obtained by using a single primary transaction log along with multiple heap logs, each having its own sequencer.

The log data generated by log writers 110 may be organized into logically-disjoint entities called streams. Streams are defined by the software application and the log data may support an unbounded number of streams. A write to a storage unit is identified by an LSN. When a log writer 110 issues a request to write data to the transaction log or to the heap log, it provides an LSN and a set of <stream, payload> pairs. The write to a log is atomic, in that either all streams are modified or none are modified. Any given LSN can only be written only once to a particular log. Therefore, once a write to a particular LSN of a particular log is acknowledged to a client by a storage unit, the storage unit will return an error in response to any subsequent requests to write to the particular LSN of the log.

Metastore 134 may store a directory of available storage units as well as storage cluster configuration information. Metastore 134 may also store mappings between log fragments and storage clusters. Such mappings support striping, in which one storage cluster stores log fragments of one stripe (e.g., all streams for a particular subset of LSNs) of the overall log data, and other storage clusters store log fragments of other stripes of the overall log data.

Figure 4:
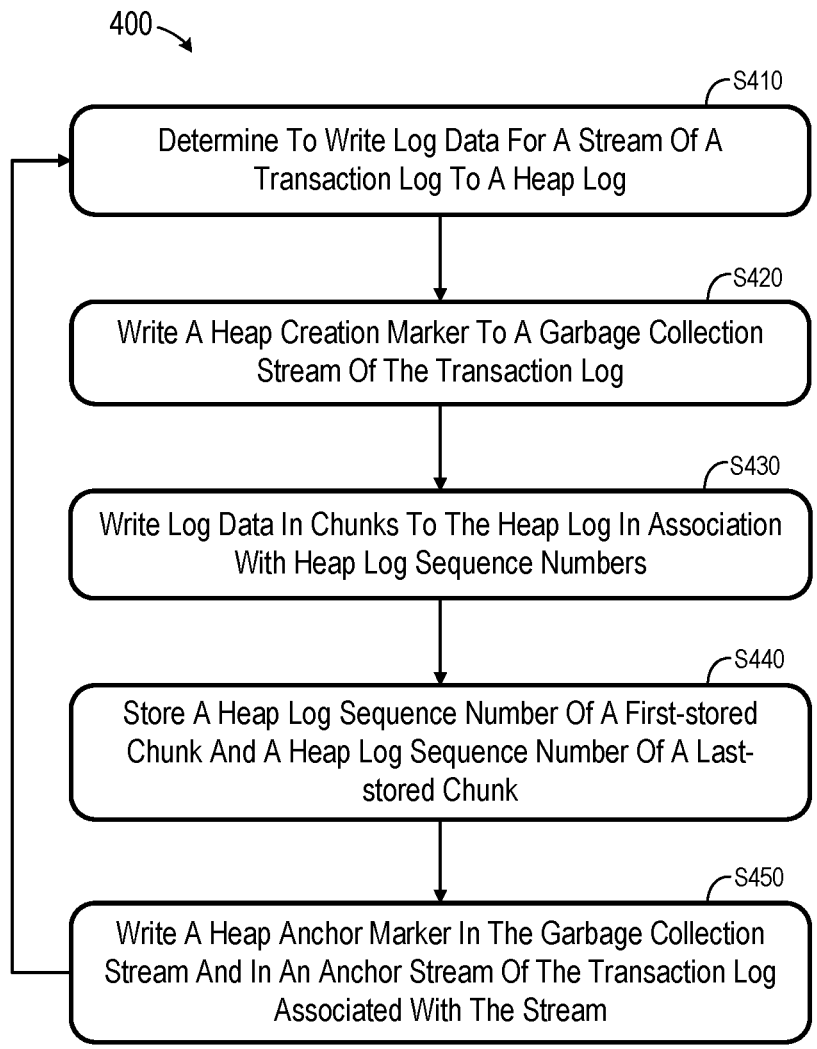
FIG. 4 is a flow diagram of a process according to some embodiments.

FIG. 4 comprises a flow diagram of process 400 according to some embodiments. In some embodiments, various hardware elements of a log writer and a storage unit execute program code to perform process 400. Processes 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S410, it is determined to write log data for a stream of a transaction to a heap log. The determination at S410 may be performed by a log writer 110 based on any one or more factors. For example, the log writer 110 may determine that the payload to be written to an LSN for the stream exceeds a threshold size. Other factors include a current number of outstanding write requests (suggesting a processing bottleneck on the storage unit) and a current CPU load of the storage unit. In the example below, the log data (i.e., payload) "abc" for stream S1 of transaction log 10 is to be written to heap log 20.

Next, at S420, a heap creation marker is written to a garbage collection stream of the transaction log. According to some embodiments, the log writer 10 requests and receives an LSN from sequencer 132 and issues a write instruction of the format write (LSN, (stream_id, payload)). According to some embodiments, the heap creation marker is formatted as Create(S, TxId), where S is the stream_id of the transaction log stream for which the log data is to be written and TxId identifies the writer. Since the heap creation marker is the payload of the write request issued at S420, the full write request may be as follows: write (0, (GC, Create(S1, TxA))). The storage unit which receives the request (and which is assigned to host writes associated with the LSN) then writes the payload to the GC stream of the transaction log at the indicated LSN as shown in FIG. 5.

The log data to be written for the stream is then written in chunks to the heap log at S430, in association with heap log sequence numbers. The heap log sequence numbers may be independent of the LSNs of the transaction log. For example, the log writer 10 requests and receives a heap log sequence number (HLSN) from sequencer 132 (in a case that sequencer 132 is responsible for independently managing the LSNs and the HLSNs) or from an independent heap log sequencer, and issues an instruction having the format write (HLSN, (heap_log_stream_id, first chunk)).

The heap_log_stream_id is formatted as S-TxId according to some embodiments. Continuing with the present example, the first instruction issued at S430 may comprise: write (0, (S1-TxA, "a")). A new HLSN and write request are issued for each subsequent chunk. The storage unit which receives the requests writes the chunks (i.e., the request payloads) to the specified stream at the specified HLSNs of heap log 20 as shown in FIG. 5.

The log writer stores a HLSN of a first-stored chunk and a HLSN of a last-stored chunk in a local memory at S440. In the present example, the stored HLSNs are 0 (i.e., FirstHLSN) and 4 (i.e., LastHLSN).

A heap anchor marker is written in the GC stream of the transaction log at S450. The heap anchor marker is also written in an anchor stream of the transaction log which is associated with the stream of the determination at S410. The format of a heap anchor marker according to some embodiments is Anchor(S, TxId, FirstHLSN, LastHLSN+1). The heap anchor marker to be written at S450 based on the current example is therefore Anchor(S1, TxA, 0, 5). The request issued at S450 may comprise write (2, (GC, Anchor (S1, TxA, 0, 5)), (S1-AnchorStream, Anchor(S1, TxA, 0, 5))). In response, the storage unit writes the heap anchor marker in the GC stream and the specified anchor stream of transaction log 10 as shown in FIG. 6.

According to some embodiments, a log writer may write log data for more than one stream of a transaction log to a heap log atomically at the same LSN. In this case, a (stream, payload) pair corresponding to each of the additional streams is added to the instruction issued at S420. For example, in a case that it is determined at S410 to write the log data "d" for stream S2 of transaction log 10 to heap log 20, the writing of suitable heap creation markers to the GC stream may be requested as follows: write (0, (GC, [Create (S1, TxA), Create(S2, TxA)])). FIG. 7 illustrates the heap creation markers written to the GC stream of transaction log 10 at LSN 0.

The writing of the log data to the heap log at S430 may proceed independently with respect to each heap, as described above in the case of a single heap. FIG. 7 also shows the writing of data "d" to a stream of heap log 20 at HLSN 1. As mentioned above, stream S2-TxA corresponds to the stream (i.e., S2) of transaction log 10 to which the log data belongs.

The heap log sequence numbers of the first and last chunk of each stored heap are stored at S440, and then used at S450 to atomically write heap anchor markers for each heap to the GC stream and to the corresponding anchor stream at S450. Continuing the present example, the heap anchor markers are written as shown in FIG. 8 in response to the request write (2, (GC, [Anchor(S1, TxA, 0, 5), Anchor(S2, TxA, 1, 2)], (S1-AnchorStream, Anchor(S1, TxA, 0, 5)), (S2-AnchorStream, Anchor(S2, TxA, 1, 2))).

"Regular" log data may also be written to appropriate LSNs of transaction log 10 atomically along with heap markers. For example, the payload "e" may be additionally written to stream S3 of transaction log 10 at LSN 2 using the write request (2, (GC, [Anchor(S1, TxA, 0, 5), Anchor(S2, TxA, 1, 2)], (S1-AnchorStream, Anchor(S1, TxA, 0, 5)), (S2-AnchorStream, Anchor(S2, TxA, 1, 2)), (S3, e))).

Embodiments of the foregoing facilitate scanning of the logs to reconstruct consistent log data. In one example, a client calls Scan(T1, LSNRange, Streams), where T1 refers to a transaction log such as transaction log 10.

For each stream of the specified Streams, the storage unit's client library reads the stream and its associated anchor stream in LSN order. Upon encountering a heap anchor in an anchor stream (e.g., S1-AnchorStream) at a particular LSN, the client library considers the particular LSN to be a hole in its corresponding top-level stream (e.g., S1). Consequently, the client library doesn't provide data for later LSNs of the stream to the requesting client.

Rather, the client library scans the heap log for the heap data referenced by the encountered heap anchor. As mentioned above, the heap anchor specifies a stream of the heap log and a range of HLSNs. Accordingly, the heap data is retrieved from the specified stream within and including the range of HLSNs. The heap data is returned to the client application and the hole in the corresponding top-level stream is considered filled, allowing data for later LSNs of the stream to be provided to the client.

Scan results are to be returned to the client in LSN order within each stream. This means that in each stream, any data that comes after heap data (including other heap data) cannot be returned to the client until all of that heap's data is returned to the client. In the meantime, this later data must be buffered by the client library. Heap data may be arbitrarily large, so having to buffer later heap data in a stream while waiting for completion of the scans of earlier heap data in the stream might not be feasible.

In some embodiments, the following rule may be enforced to avoid buffering arbitrarily large amounts of data: In each stream, a heap log scan based on an earlier heap anchor must complete before the scan for any heap log scan based on a later heap anchor is initiated. Multiple scans of heap data may can occur in parallel with each other (and with ongoing scanning of the transaction log) so long as this rule is satisfied. This ensures that the results of the heap log scans can be returned to the client without needing to be buffered in the scan server.

According to some embodiments, if heap anchors occur at the beginning of the scan range and the corresponding heap data are large, then the client library may have to buffer data retrieved during an entire transaction log scan while waiting for the heap log scans to complete. The client may control bounds on the amount of potential memory required for buffering by dividing the scan into smaller LSN ranges. The client has control over the maximum payload size it will write into each LSN of the transaction log (where larger-sized payloads are written using heap anchors and a heap log), and this can be used to determine the upper bound on memory for buffering during a scan (e.g., NumLSNs× NumStreams×MaxTransactionLogRecordSize).

There are two scenarios where space used for heap data should be reclaimed: writer death, and trimmed anchors. Writer death occurs when a client creates a heap and writes some heap data to the heap log, but then crashes before it is able to anchor the heap in the transaction log. The transaction log may provide garbage collector (GC) facilities to support cleanup of heaps in this scenario.

In order to determine which heaps need to be cleaned up, the GC requires metadata describing which heaps have been created but not yet anchored or aborted. Clients provide this metadata by writing heap markers into the GC stream in the transaction log as described above to track when heaps are created, aborted, or anchored.

According to some embodiments, a client scans from the beginning to end of the GC stream in the transaction log, identifying any Create heap markers for which a matching Anchor or Abort heap marker does not exist. For each identified heap that is associated with a stream, the GC calls the client to see if the transaction writing to the heap is still alive.

If the transaction is not active, the GC deletes the stream associated with the heap in the heap store log, writes an Abort heap marker to the GC stream and deletes the associated Create heap marker from the identified Create heap markers. The GC also trims the GC stream of all entries before the earliest (i.e., having the lowest LSN) remaining Create heap marker.

Different clients may create heaps in the same transaction log. Each of these clients would include a different entity that is queried to determine if the transaction writing to a given heap is still alive as mentioned above. To address this scenario, each client which uses heaps may be responsible for running garbage collection on its own streams In addition to reclaiming the space used by heaps, the transaction log reclaims the space used by the heap markers in the GC stream once they are no longer needed by trimming the GC stream as mentioned above. Consequently, the information from the GC stream may only be used for garbage collection, since heap anchors may be trimmed from the GC stream before a client requests that they be trimmed from their top-level streams.

When a client performs a trim operation that removes heap anchors from a stream, the space used by the heaps referenced by those anchors may also be reclaimed. According to some embodiments, the client calls FindAnchors (TransactionLog, [0 . . . LSN], S), which returns a list of anchors $[a_1, a_2, \ldots, a_n]$. For each anchor of the list, the client calls DeleteStream(HeapLog, HeapStreamID). These requests can all happen in parallel and, once complete, the client issues Trim(TransactionLog, LSN, Stream) to the storage unit.

Since trims are best-effort, it is possible that FindAnchors will include some heap anchors that were already cleaned up as part of a previous trim. It should therefore be permissible to call DeleteStream( ) twice for the same stream. Trims implicitly start at 0, and are therefore sent to all storage units in all segments. Alternatively, the client may provide the previous trim point for the stream as a parameter to Trim, and use that point as the beginning of the range for the trim. This would allow the client to only send the FindAnchors and Trim requests to the storage units which are part of segments covered by the Trim.

In some embodiments, multiple heap logs, each associated with its own sequencer, are used for each transaction log. This arrangement could reduce contention on the sequencer for the heap log sequence numbers. To facilitate the use of multiple heap logs, heap markers (i.e., Create, Anchor, and Abort) may include a field to specify which heap log they reference. Available heap logs may be determined from the management host, and the projection for a transaction log could contain a list of heap logs associated with it.

If there is a global LSN hole (across all streams) in the transaction log, the transaction log will not allow scans of any stream beyond that point, because the data that will eventually be written to that hole may be associated with the stream that is being scanned. If clients were allowed to scan past this hole, they might miss that data. This restriction can be removed for scans of heap data in the heap log. Once an anchor is written referencing a heap in the heap log, an implicit guarantee exists that the client is finished writing all of its data to that heap stream in the heap log between the LSN range specified in the anchor. As a result, by the time another client reads the anchor from the transaction log, it is guaranteed that any holes in the heap log in that range are not missing data from the heap stream.

Due to the removal of this restriction, a reader of one heap will never get stuck waiting for the writer of a different heap to finish. Fill operations would therefore not be needed on the heap log. Writers would be able to write many LSNs for a heap in parallel, without concern about any of the writes failing due to fills. The heap writes would not require any header information to deal with out-of-order writes.

Embodiments may be employed for purposes other than as a commit log for a database. For example, embodiments may support a distributed message bus.

Figure 1:
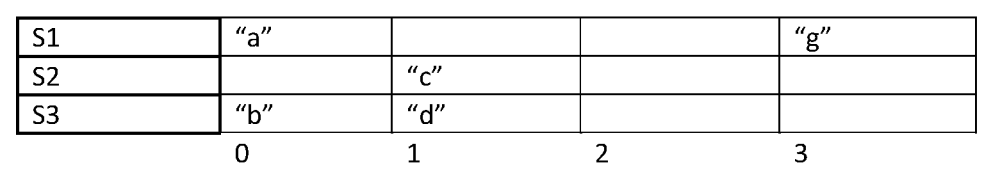
Figure 9:
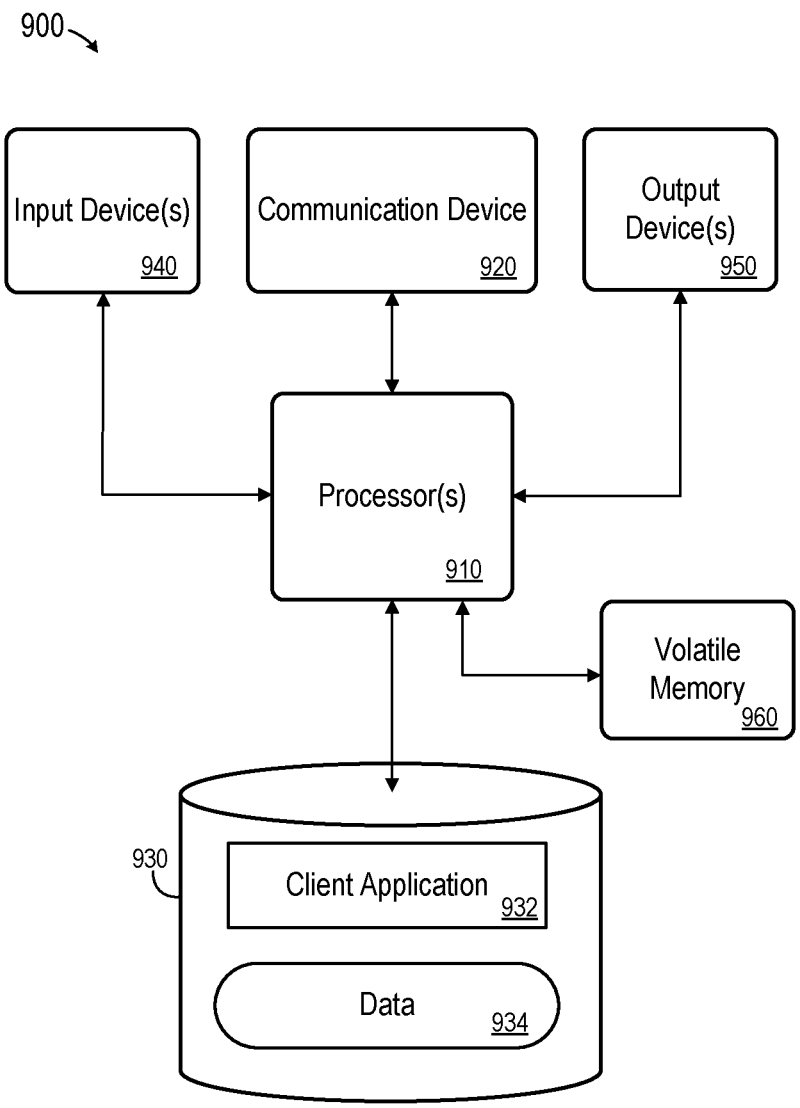
FIG. 9 is a block diagram of a system according to some embodiments.

FIG. 9 is a block diagram of system 900 according to some embodiments. System 900 may comprise a general-purpose computing apparatus and may execute program code to perform any of the functions described herein. System 900 may comprise an implementation of a log writer of FIG. 1. System 900 may include other unshown elements according to some embodiments.

System 900 includes processor(s) 910 operatively coupled to communication device 920, data storage device 930, one or more input devices 940, one or more output devices 950, and volatile memory 960. Communication device 920 may facilitate communication with an external network, and thereby with storage units and management devices. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into system 900. Output device(s) 950 may comprise, for example, a display (e.g., a display screen) a speaker, and/or a printer.

Volatile memory 960 may comprise Random Access Memory (RAM), Storage Class Memory (SCM) or any other fast-access memory. Data storage device 930 may comprise any appropriate filesystem-managed persistent storage device, including combinations of magnetic storage devices (e.g., magnetic tape, hard disk drives and flash memory), optical storage devices, Read Only Memory (ROM) devices, etc.

Client application 932 and may comprise program code executed by processor(s) 910 to cause system 900 to perform any one or more of the processes described herein. For example, client application 932 may be executed to write log data to a transaction log and to a heap log of a storage unit based on transactions upon data 934. Embodiments are not limited to execution of these processes by a single apparatus. Data storage device 930 may also store data and other program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a non-volatile memory system; and
   one or more processors to execute processor-executable process steps to cause the system to:
   write log data in chunks, by a log writer, over a first range of heap log sequence positions of a heap log stored in the non-volatile memory system; and
   write a heap anchor marker, by a heap log writer, in a first anchor stream of a transaction log stored in the non-volatile memory system, at a first transaction log sequence position of the transaction log, wherein the first anchor stream is associated with a first stream of the transaction log, and the heap anchor marker identifies the first range of heap log sequence positions of the heap log.

2. The system according to claim 1, the one or more processors to execute processor-executable process steps to cause the system to:
write a heap creation marker to a garbage collection stream at a second transaction log sequence position of the transaction log, the heap creation marker identifying the first stream of the first transaction log,
wherein writing the heap anchor marker in the first anchor stream comprises writing the heap anchor marker in the garbage collection stream at the first transaction log sequence position.

3. The system according to claim 1, the one or more processors to execute processor-executable process steps to cause the system to:
write second log data in chunks over a second range of heap log sequence positions of the heap log,
wherein writing the heap anchor marker in the first anchor stream comprises writing a second heap anchor marker in a second anchor stream of the transaction log, at the first transaction log sequence position of the transaction log,
wherein the second anchor stream is associated with a second stream of the transaction log, and the second heap anchor marker identifies the second range of heap log sequence positions of the heap log.

4. The system according to claim 3, the one or more processors to execute processor-executable process steps to cause the system to:
write a first heap creation marker and a second heap creation marker to a garbage collection stream at a second transaction log sequence position of the transaction log, the heap creation marker identifying the first stream of the first transaction log and the second heap creation marker identifying the second stream of the first transaction log,
wherein writing the heap anchor marker in the first anchor stream comprises writing the heap anchor marker in the garbage collection stream at the first transaction log sequence position, and
wherein writing the second heap anchor marker in the second anchor stream comprises writing the second heap anchor marker in the garbage collection stream at the first transaction log sequence position.

5. The system according to claim 1, the one or more processors to execute processor-executable process steps to cause the system to:
write second log data in chunks over a second range of heap log sequence positions of the heap log; and
write a second heap anchor marker in a second anchor stream of the transaction log, at a second transaction log sequence position of the transaction log,
wherein the second anchor stream is associated with a second stream of the transaction log, and the second heap anchor marker identifies the second range of heap log sequence positions of the heap log.

6. The system according to claim 5, the one or more processors to execute processor-executable process steps to cause the system to:
write a heap creation marker to a garbage collection stream at a second transaction log sequence position of the transaction log, the heap creation marker identifying the first stream of the first transaction log; and write a second heap creation marker to the garbage collection stream at a third transaction log sequence position of the transaction log, the second heap creation marker identifying the second stream of the first transaction log,
wherein writing the heap anchor marker in the first anchor stream comprises writing the heap anchor marker in the garbage collection stream at the first transaction log sequence position, and
wherein writing the second heap anchor marker in the second anchor stream comprises writing the second heap anchor marker in the garbage collection stream at the second transaction log sequence position.

7. A method comprising:
writing, by a log writer, log data in chunks over a first range of heap log sequence positions of a heap log stored in a non-volatile memory system; and
writing, by a heap log writer, a heap anchor marker in a first anchor stream of a transaction log stored in the non-volatile memory system, at a first transaction log sequence position of the transaction log,
wherein the first anchor stream is associated with a first stream of the transaction log, and the heap anchor marker identifies the first range of heap log sequence positions of the heap log.

8. The method according to claim 7, further comprising:
writing a heap creation marker to a garbage collection stream at a second transaction log sequence position of the transaction log, the heap creation marker identifying the first stream of the first transaction log,
wherein writing the heap anchor marker in the first anchor stream comprises writing the heap anchor marker in the garbage collection stream at the first transaction log sequence position.

9. The method according to claim 8, further comprising:
writing second log data in chunks over a second range of heap log sequence positions of the heap log,
wherein writing the heap anchor marker in the first anchor stream comprises writing a second heap anchor marker in a second anchor stream of the transaction log, at the first transaction log sequence position of the transaction log,
wherein the second anchor stream is associated with a second stream of the transaction log, and the second heap anchor marker identifies the second range of heap log sequence positions of the heap log.

10. The method according to claim 9, further comprising:
writing a first heap creation marker and a second heap creation marker to a garbage collection stream at a second transaction log sequence position of the transaction log, the heap creation marker identifying the first stream of the first transaction log and the second heap creation marker identifying the second stream of the first transaction log,
wherein writing the heap anchor marker in the first anchor stream comprises writing the heap anchor marker in the garbage collection stream at the first transaction log sequence position, and
wherein writing the second heap anchor marker in the second anchor stream comprises writing the second heap anchor marker in the garbage collection stream at the first transaction log sequence position.

11. The method according to claim 7, further comprising:
writing second log data in chunks over a second range of heap log sequence positions of the heap log; and writing a second heap anchor marker in a second anchor stream of the transaction log, at a second transaction log sequence position of the transaction log, wherein the second anchor stream is associated with a second stream of the transaction log, and the second heap anchor marker identifies the second range of heap log sequence positions of the heap log.

12. The method according to claim 11, further comprising:

writing a heap creation marker to a garbage collection stream at a second transaction log sequence position of the transaction log, the heap creation marker identifying the first stream of the first transaction log; and writing a second heap creation marker to the garbage collection stream at a third transaction log sequence position of the transaction log, the second heap creation marker identifying the second stream of the first transaction log, wherein writing the heap anchor marker in the first anchor stream comprises writing the heap anchor marker in the garbage collection stream at the first transaction log sequence position, and wherein writing the second heap anchor marker in the second anchor stream comprises writing the second heap anchor marker in the garbage collection stream at the second transaction log sequence position.

13. A non-transitory computer-readable medium storing processor-executable process steps to cause a computing system to:

write log data in chunks, via a log writer, over a first range of heap log sequence positions of a heap log stored in a non-volatile memory system; and write a heap anchor marker, via a heap log writer, in a first anchor stream of a transaction log stored in the non-volatile memory system, at a first transaction log sequence position of the transaction log, wherein the first anchor stream is associated with a first stream of the transaction log, and the heap anchor marker identifies the first range of heap log sequence positions of the heap log.

14. The medium according to claim 13, the processor-executable process steps to further cause a computing system to:

write a heap creation marker to a garbage collection stream at a second transaction log sequence position of the transaction log, the heap creation marker identifying the first stream of the first transaction log, wherein writing the heap anchor marker in the first anchor stream comprises writing the heap anchor marker in the garbage collection stream at the first transaction log sequence position.

15. The medium according to claim 13, the processor-executable process steps to further cause a computing system to:

write second log data in chunks over a second range of heap log sequence positions of the heap log, wherein writing the heap anchor marker in the first anchor stream comprises writing a second heap anchor marker in a second anchor stream of the transaction log, at the first transaction log sequence position of the transaction log, wherein the second anchor stream is associated with a second stream of the transaction log, and the second heap anchor marker identifies the second range of heap log sequence positions of the heap log.

16. The medium according to claim 15, the processor-executable process steps to further cause a computing system to:

write a first heap creation marker and a second heap creation marker to a garbage collection stream at a second transaction log sequence position of the transaction log, the heap creation marker identifying the first stream of the first transaction log and the second heap creation marker identifying the second stream of the first transaction log, wherein writing the heap anchor marker in the first anchor stream comprises writing the heap anchor marker in the garbage collection stream at the first transaction log sequence position, and wherein writing the second heap anchor marker in the second anchor stream comprises writing the second heap anchor marker in the garbage collection stream at the first transaction log sequence position.

17. The medium according to claim 13, the processor-executable process steps to further cause a computing system to:

write second log data in chunks over a second range of heap log sequence positions of the heap log; and write a second heap anchor marker in a second anchor stream of the transaction log, at a second transaction log sequence position of the transaction log, wherein the second anchor stream is associated with a second stream of the transaction log, and the second heap anchor marker identifies the second range of heap log sequence positions of the heap log.

18. The medium according to claim 17, the processor-executable process steps to further cause a computing system to:

write a heap creation marker to a garbage collection stream at a second transaction log sequence position of the transaction log, the heap creation marker identifying the first stream of the first transaction log; and write a second heap creation marker to the garbage collection stream at a third transaction log sequence position of the transaction log, the second heap creation marker identifying the second stream of the first transaction log, wherein writing the heap anchor marker in the first anchor stream comprises writing the heap anchor marker in the garbage collection stream at the first transaction log sequence position, and wherein writing the second heap anchor marker in the second anchor stream comprises writing the second heap anchor marker in the garbage collection stream at the second transaction log sequence position.

* * * * *